United States Patent [19]

Hall

[11] 4,323,102
[45] Apr. 6, 1982

[54] DIRT SEAL FOR REMOVABLE RUBBER BELTS

[75] Inventor: Robert E. Hall, Stow, Ohio

[73] Assignee: The Goodyear Tire & Rubber Company, Akron, Ohio

[21] Appl. No.: 73,591

[22] Filed: Sep. 10, 1979

Related U.S. Application Data

[63] Continuation of Ser. No. 872,529, Jan. 26, 1978, abandoned.

[51] Int. Cl.$^3$ .................. B60C 27/06; B60C 27/00; B62D 55/08
[52] U.S. Cl. .................. 152/175; 152/185.1; 152/187; 305/35 EB; 305/38
[58] Field of Search .................. 152/185.1, 169–170, 152/172–173, 174, 178, 179, 182, 187, 190, 191, 210, 357 A; 305/11, 19, 54, 38, 35 R, 35 EB; 277/34.3; 156/110 CL, 110 R, 125, 137

[56] References Cited

U.S. PATENT DOCUMENTS

| | | | |
|---|---|---|---|
| 3,899,220 | 8/1975 | Grawey et al. | 152/182 X |
| 4,046,428 | 9/1977 | Bauer | 305/19 X |
| 4,086,947 | 5/1978 | Payne | 305/35 EB X |

Primary Examiner—William A. Powell
Assistant Examiner—Thomas Bokan
Attorney, Agent, or Firm—D. M. Ronyak

[57] ABSTRACT

Elongated resilient sealing strips seal the spaces between pairs of adjacent articulated traction shoes of a removable track for tires. Each sealing strip is of chevron-or V-shaped cross-section and is integrally molded of the belt. Each leg of the chevron or V is provided with a surface for engagement with the surface of one of said traction shoes. Biasing means may be incorporated into the sealing strip to further assure sealing engagement. The composition of the strip may differ from that of the outer elastomer layer of the belt.

13 Claims, 16 Drawing Figures

DIRT SEAL FOR REMOVABLE RUBBER BELTS

This application is a continuation of Ser. No. 872,529, filed Jan. 26, 1978 now abandoned.

BACKGROUND OF THE INVENTION

This invention relates generally to a removable track for an annular resilient tire, and in particular to a removable track provided with dirt-sealing strips. The track has a substantially inextensible annular belt for mounting on the outer circumferential surface of the tire and wear-resistant metal traction shoes clamped on the radially outer surface of the belt. The track-tire assembly is especially suited for off-the-road use over rock or other sharp or abrasive materials which have caused excessive cutting damage and tread wear of conventional off-the-road tires.

Inflation of the tire produces a tight seal between the belt and the tire; however, wear of the belt under the shoes has been a problem because of dust, dirt, rock particles and other foreign materials entering the space between the shoes and the belt. The accumulation of such foreign material places additional stress on the traction shoe retainers, decreasing fatigue life of the same.

During operation of the track-tire assembly, the traction shoes and belt undergo complex movement. Upon entry and exit of the adjacent traction shoes into the footprint or ground-engaging area of the tire, a torque about a horizontal axis is present in the traction shoe just leaving or just engaging the ground. This torque is caused both by the vertical load imposed upon the traction shoe by the vehicle and tire weight and the torque transmitted from the vehicle axle through the tire and the traction shoe to propel the vehicle. This torque within the traction shoe results in a displacement of its leading edge and trailing edge surfaces that is much more severe than simple articulation which occurs in all metallic vehicle track members or in articulated conveyor belt systems. If the vehicle is turning, an additional different torque will be imposed upon those traction shoes entering, exiting, or fully within the footprint region. This torque is about a vertical axis and causes the axially inner and axially outer portions of the leading and trailing edges of adjacent traction shoes to be at different distances from one another. The movement of adjacent track members in or near to the footprint region may be even further amplified if one of the track members or a portion thereof engages a rock or other non-uniformity on the ground. Such non-uniformity can result in very severe local loading of the track member and annular belt resulting not only in a change of the angle between the leading edge surface and the trailing edge surface but also in a radial shifting of adjacent track members.

Various devices have been proposed for sealing the space between adjacent traction shoes. In U.S. Pat. No. 3,899,220, issued to Grawey, sealing is effected by including transverse raised solid ribs on the belt surface between traction shoes. The leading and trailing edges of adjacent track shoes abut against the raised ridges on opposite sides thereof to effect sealing. Alternatively, sealing grooves may be provided in the belt surface which mate with ridges on the shoes. In U.S. Pat. No. 4,043,609, issued to Vidakovic et al, a transverse rib or plug is positioned between the shoes of adjacent assemblies. Alternatively, the rib or plug is integrally formed of the outer surface of the belt. In both embodiments, the rib portion is formed of a resilient elastomer into a solid body whose sides sealingly engage the leading and trailing edges of adjacent traction shoes. In U.S. Pat. No. 4,046,428, issued to Bauer, sealing is effected by providing a separately manufactured elongated resilient sealing strip having slender ribs or fingers between each pair of adjacent articulated traction shoes.

Such attempts at sealing the spaces between adjacent traction shoes have not proven fully effective. Solid rib or plug designs depend upon compression of the sides of the elastomer rib or plug against the adjacent traction shoe surfaces for sealing. The amount of movement of the traction shoes relative to the seals often exceeds the amount which the rib or plug is compressed thus resulting in loss of sealing engagement. The elastomer cannot be compressed beyond a certain amount without permanent damage or deformation. Thus, the effectiveness of these seal designs is limited by the elastomer's compressive properties. Additionally, movement of one traction shoe is transmitted through the solid rib or ply to affect the adjacent traction shoe. Movement of one traction shoe may result in loss of sealing effectiveness not only to itself but also to its neighbor. If the sealing ribs are not located properly relative to the traction shoe sites, they may not be in sealing engagement with the traction shoes. Solid sealing rib designs require extreme accuracy. Such accuracy is difficult and costly to achieve. Separately maufactured seals may be torn loose under the normally severe operating conditions of the track-tire assembly. Seal designs having multiple slender flexible fingers for engagement with a particular traction shoe are not only difficult to manufacture integral with the belt but are also vulnerable to tearing or other damage. When the seal is adhered to one or both of a pair of adjacent traction shoes, the movement of one traction shoe necessarily effects engagement of the seal with the other traction shoe.

Fillers have been used on articulated conveyor belts to provide an uninterrupted surface. Examples of such arrangements are given in U.S. Pat. No. 3,202,266 to Schmermund. However, the lengths of these conveyor belts are not subject to the stresses and adverse operating conditions under which the traction shoes of a track-tire assembly must operate. Adjacent links of these conveyor belts do not undergo the hereinbefore-described complex movement relative to each other as do adjacent traction shoes. Also, it is not desirable to fill the space between the traction shoe sites at the radially outermost surface because this reduces the traction provided by the shoes and detracts from cleaning of the tread.

With the foregoing in mind, it is a principal object of this invention to provide a fully sealed track belt that prohibits the ingress of soil, rock, and other foreign material between the track shoes during articulation of the belt and shoes and to thereby improve service life.

Another object is to seal each traction shoe so that movement of one traction shoe does not adversely affect sealing of the adjacent shoes.

Another object is to provide for flexing of the sealing ribs upon articulation or radial displacement of the track members to maintain the seal.

A further object is to provide an annular track belt having an integrally molded seal whose sealing effectiveness is less dependent on manufacturing accuracy than known sealed track belts of similar application.

Another object is to provide an annular belt having an integrally molded seal which can be readily removed from the mold after vulcanization.

A still further object is to provide an annular belt having an integrally molded seal having increased resistance to abrasion, cutting, and tearing.

A still further object is to provide an annular belt having an integrally molded seal whose sealing faces are positively urged into contact with the traction shoes through mechanical means.

SUMMARY OF THE INVENTION

These and other objects of the invention may be achieved by providing elongated resilient sealing strips integrally molded to the radially outer surface of the annular belt. Sealing members are positioned on the radially outer surface of the annular belt at circumferentially spaced apart positions such that they will be disposed between the traction shoes. In a preferred embodiment, each sealing strip is of chevron-shaped or V-shaped cross-section with the point of the chevron or V being adjacent the radially outer surface of the annular belt. Each leg of the sealing strip is a tapered flexible rib extending substantially radially outward from the radially outer surface of the annular belt. One leg sealingly engages the trailing edge of a track shoe; the other leg sealingly engages the leading edge of the adjacent traction shoe. To further assure sealing engagement with the traction shoe, the strip may be provided with biasing means, such as a spring or pneumatic chamber. The compound of which the seal is formed may differ from that of the outer surface of the belt and may be reinforced with dispersed staple fibers.

To the accomplishment of the foregoing and related ends, the invention then comprises the features hereinafter fully described and particularly pointed out in the claims. The following description and annexed drawings setting forth in detail certain illustrative embodiments of the invention these being indicative of the preferred way in which the principles of the invention may be employed.

BRIEF DESCRIPTION OF THE DRAWINGS

The invention presented herein is shown in the following drawings in which:

Referring to FIG. 1, a removable track 10 is shown mounted on an annular resilient tire 11 which may be mounted on the rim of a wheel (not shown). The track 10 may be of the type wherein the tire 11 is of resilient rubber or other rubber-like material reinforced by a ply or plies and having an outer circumferential surface 12 on which a cylindrical belt 13 of the track 10 is mounted. The belt 13 is an annular body of resilient rubber or other rubberlike material reinforced by circumferentially-oriented cords of steel or other substantially non-extensible material so that the belt is in the form of a flexible ring which may be placed over the outer circumferential surface 12 of the tire 11. In the preferred embodiment, the tire 11 is pneumatic and the belt 13 of the track 10 is held on the outer circumferential surface 12 of the tire by inflation of the tire providing torque transmitting and sealing engagement between the tire and the belt.

Figure 1:
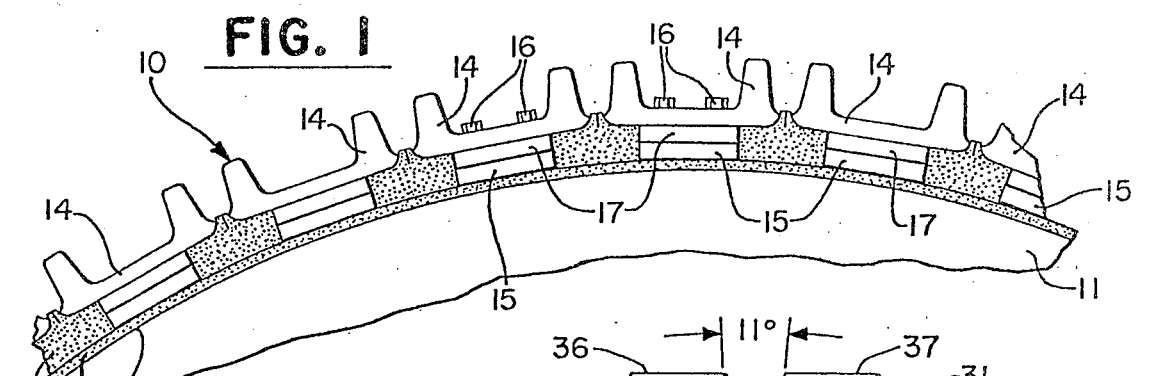
FIG. 1 is a fragmentary side elevation of a removable track-tire assembly mounted on a rim (not shown)

The belt 13 extends longitudinally along the circumference of the tire 11 and carries a plurality of track members 14 which may be of steel or other wear-resisting material for engagement with the earth. The traction shoes 14 are mounted at circumferentially spaced-apart positions along the belt 13 and are clamped to the belt by suitable means. In the present embodiment, mounting bars 15 are fitted into slots molded on the inside surface of the belt 13 at spaced-apart positions circumferentially of the belt. The ends of the mounting bars 15 extend from the edges of the belt 13 and have openings in alignment with openings in the traction shoes 14 through which fasteners such as bolts 16 extend. Retainer plates or nuts 17 are positioned under the ends of the mounting bars 15 and have threaded holes in alignment with holes in the mounting bars and traction shoes 14 for threaded engagement with the bolts 16. Tightening of the bolts 16 clamps the traction shoes 14 to a radially outer surface 18 of the belt 13.

Figure 3A:
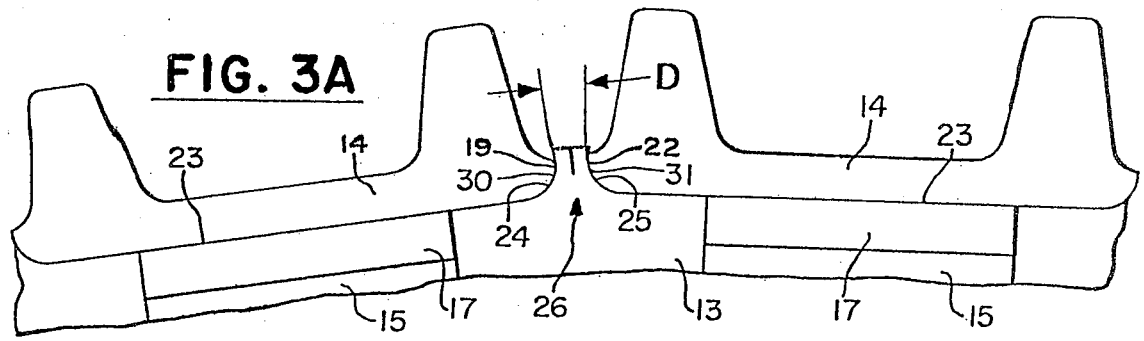
FIG. 3A is an enlarged fragmentary view like FIG. 1 showing the sealing strip in sealing engagement with the traction shoes.
Figure 3B:
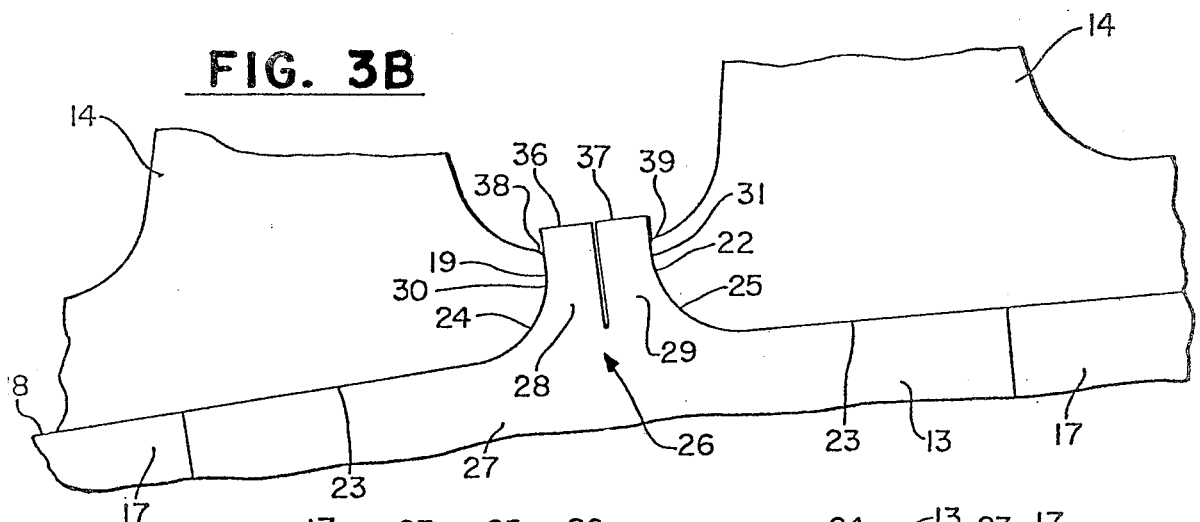
FIG. 3B is a greatly enlarged fragmentary view like FIG. 3A.
Figure 4B:
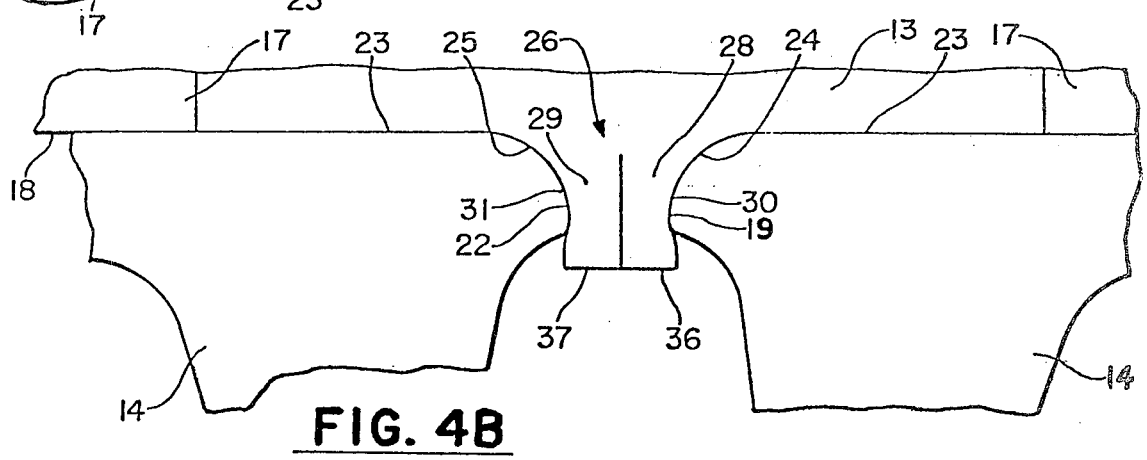
FIG. 4B is a greatly enlarged fragmentary view like FIG. 4A.

As shown more clearly in FIGS. 3A and 3B, each of the traction shoes 14 has a leading edge surface 19 and trailing edge surface 22. The leading edge surface 19 and the trailing edge surface 22 are connected to a belt-engaging surface 23 of the traction shoes 14. The leading edge surface 19 and the belt-engaging surface 23 are generally planar and connected by a curved surface 24. Likewise, the trailing edge surface 22 and the belt-engaging surface 23 are generally flat and connected by a curved surface 25.

The space between the leading edge surface 19 and the trailing edge surface 22 of adjacent shoes is sealed by a sealing member such as sealing strip 26 positioned between adjacent track shoes to prevent passage of abrasive material, such as dirt, dust, crushed rock, or other foreign material from entering the space between the belt-engaging surface 23 of the traction shoes and the radially outer surface 18 of the belt 13. The sealing strip 26 may be of a resilient plastic or rubber-like material and in the preferred embodiment is a molded elongated body of rubber having high resistance to permanent compression set, abrasion, and tearing.

Figure 2:
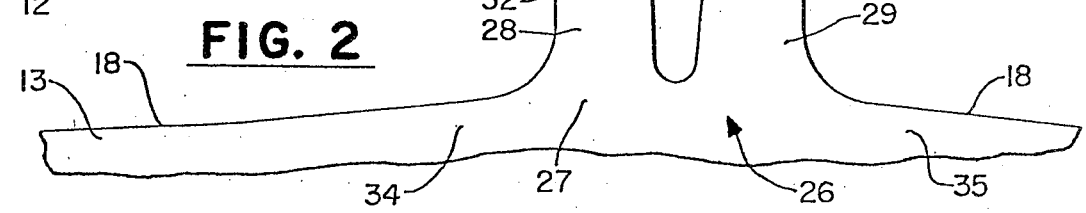
FIG. 2 is an enlarged cross-section of a fragment of the belt illustrating one of the sealing members according to a preferred embodiment of the invention in its free as-molded form.

As shown more clearly in FIG. 2, the sealing strip 26 has a longitudinally elongated base 27 with curved edge tapered portions 34 and 35, which base is integral with the radially outer surface 18 of the belt 13. The sealing strip has two legs 28 and 29, each of which rises substantially radially outward from the outer surface 18 of the belt 13. Legs 28 and 29 have a space or hollow between them to enable free movement of their sealing faces 30 and 31 without substantial bulk compression of the elastomer circumferentially between them. In a preferred embodiment, such as that shown in FIGS. 2, 3A, 3B, 4A, 4B, 5A and 5B, the sealing strip in its free as-molded form is of a chevron-shaped or V-shaped cross-section. The radially oriented planar surfaces 30 and 31 most circumferentially spaced apart are substantially parallel. Surface 32 of the first leg 28 and surface 33 of the second leg 29 are adjacent and preferably are not parallel but diverge from the radius at their radially innermost points. Such configuration insures easy release of the belt 13 with integrally molded seal members 26 from its mold.

It is desirable that the legs of the seal member be of greater cross-section near their base 27 and of lesser cross-section at their outermost tips 36 and 37. This not only aids mold release but also aids in even transmission of the sealing force through each tapered leg to its radially oriented sealing surfaces 30 or 31. In a preferred embodiment, the angle formed by surfaces 32 and 33 is about 11 degrees and the width of the radially outermost tip of each leg is about 0.30 inches when the length of each leg is about 0.50 inches. As shown in FIGS. 3A, 3B, 4A, 4B, 5A, and 5B, the height or length of each of the legs 28 and 29 is such that they reach slightly above the shoulders 38 and 39 of the track shoes. This is to insure that sealing contact will be maintained during displacement of the traction shoes relative to one another as shown in FIGS. 5A and 5B.

The sealing strip 26 in its undeformed state or as-molded form is shown clearly in FIG. 2. Legs 28 and 29 are circumferentially apart from one another. When traction shoes 14 are fastened to the annular belt 13 on either side of a given sealing strip 26, the legs 28 and 29 are circumferentially disposed toward one another as shown in FIGS. 3A and 3B, reducing or eliminating the gap between them. It is not essential that the gap between the legs 28 and 29 be eliminated upon installation of the traction shoes. It is essential that each leg be displaced circumferentially from its initial as-molded position so as to bend or rotate the leg and thus create a moment or torque which acts to urge the sealing surface 30 of leg 28 and 31 of leg 29 against its respective traction shoe. The dimensions of the sealing member 26, the spacing between its legs 28 and 29, the size of the traction shoes and their circumferential spacing may be chosen such that when the traction shoes 14 are fastened to the belt 13 with the proper torque the gap between legs 28 and 29 will be virtually eliminated, as shown in FIGS. 3A and 3B.

Figure 4A:
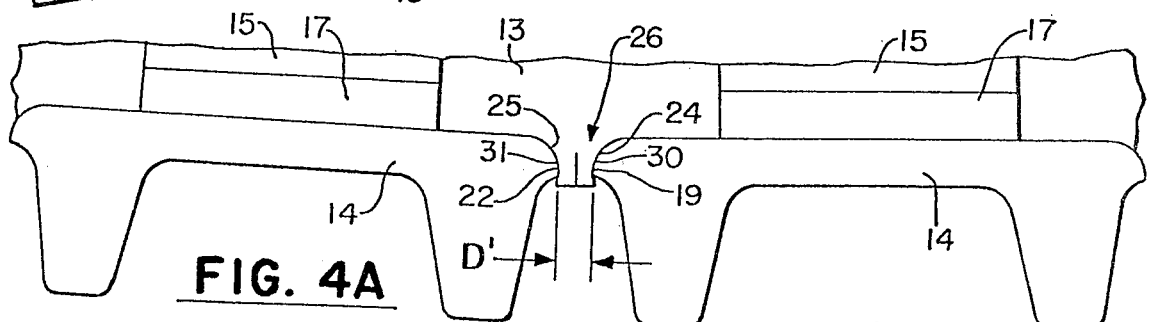
FIG. 4A is an enlarged fragmentary view like FIG. 3A showing the sealing strip in sealing engagement with the traction shoes which are deflected as when the shoes are in engagement with the ground.
Figure 5A:
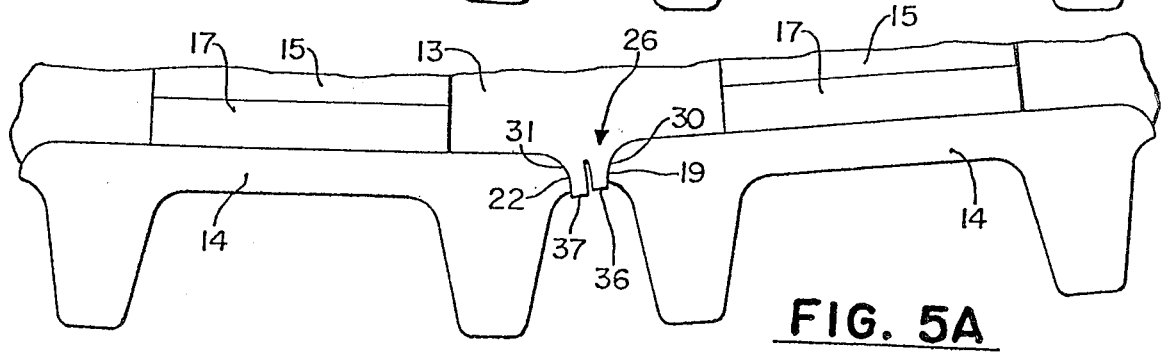
FIG. 5A is an enlarged fragmentary view like FIG. 3A showing the sealing strip in sealing engagement with two adjacent traction shoes during articulation of the traction shoes relative to one another.
Figure 5B:
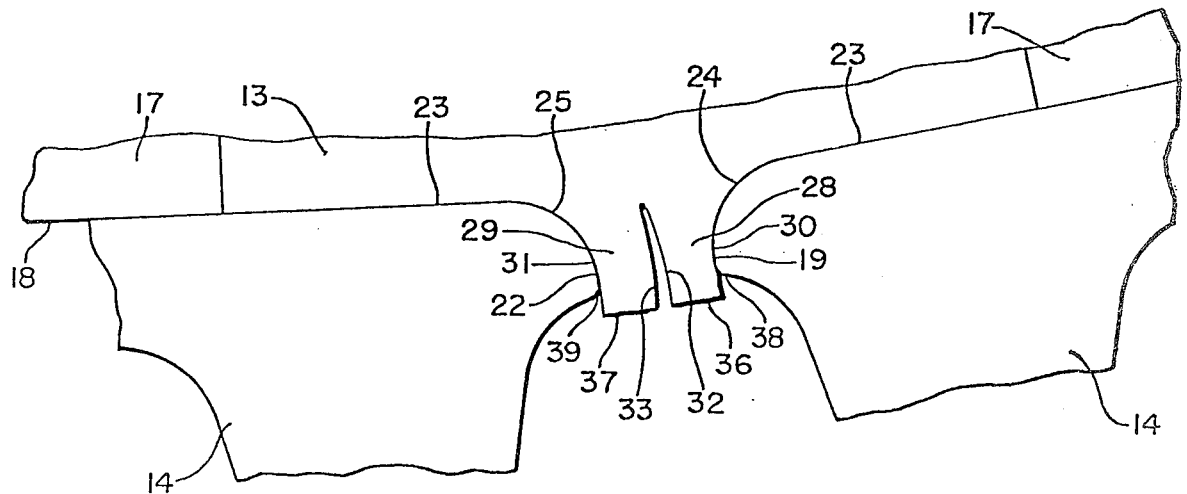
FIG. 5B is a greatly enlarged fragmentary view like FIG. 5A.

As the tire 11 and track 10 rotate, the traction shoes 14 will engage the earth and the tire and belt 13 will be brought from the position shown in FIG. 3A to a position such as that shown in FIG. 4A. As the traction shoes 14 articulate, the angle D between the leading edge surface 19 and the trailing edge surface 22 decreases to an angle D', further bending and/or compressing the legs 28 and 29 of the sealing strip 26 to maintain the seal during this articulation. Additionally, the shoes may move closer together in the load-bearing region of the track-tire assembly.

As previously mentioned, upon entry and exit of the adjacent traction shoes into the footprint or ground-engaging area of the tire, a torque about a horizontal axis is present in the traction shoe just leaving or just engaging the ground. This torque within the traction shoe 14 results in a displacement of the leading edge surface 19 and the trailing edge surface 22 of adjacent traction shoes such as is depicted in FIGS. 5A and 5B. This movement may be further amplified if one of the track members or a portion thereof engages a rock or other non-uniformity on the ground or if the vehicle is conducting a turning maneuver. The result is not only a change of the angle D between the leading edge surface 19 and the trailing edge surface 22 but also in a radial shifting of the shoulder portions 38 and 39 of adjacent track members. Turning maneuvers will cause the leading edge surface 19 and trailing edge surface 22 to be unequally spaced at their axially inboard and axially outboard ends and to define an angle between them (not shown).

Such severe service demands extremely high conformability of the sealing member to assure continuing engagement of its surfaces 30,31 with those of adjacent track members 14. Conformability as used here means the ability of the seal to change shape or of parts of it to change position to maintain contact of each sealing edge surface with its respective traction shoe surface. Upon installation, as previously discussed, the legs 28,29 of each sealing member 26 were circumferentially displaced thus creating a torque within each leg. This torque is utilized to maintain contact of the sealing surfaces 30,31 even though the leading edge surface 19 and trailing edge surface 22 of adjacent track shoes 14 undergo relatively large movement to one another. Each leg is free to conform independently of the other. If the dimensions of the track belt 13, sealing members 26 and traction shoes 14 are properly chosen, attachment of the traction shoes 14 to the belt 13 can result in sufficient circumferential displacement of the legs 28,29 of each sealing member 26 so they not only abut one another but are in circumferential compression as well as in radial compression. This arrangement maintains contact of surfaces 30,31 of the sealing member 26, legs 28,29, with the traction shoe surfaces 19,22 first by release of the compression of the elastomeric material of the legs 28,29 and second by a spreading or divergence of the legs 28,29 from internal torque. Sealing engagement with the traction shoes can be maintained over a much greater movement of the traction shoes than with previous integrally molded seals. Previous integrally molded seals maintain sealing engagement only to the point where their sealing faces have recovered to their as-molded dimensions minus the amount of compression set the elastomer of the seal has taken.

Figure 6:
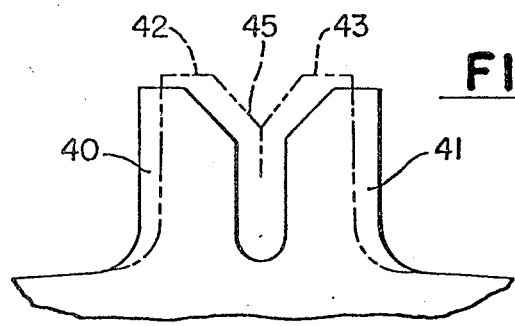
FIGS. 6, 7, and 8 are enlarged cross-sectional views of three different embodiments of sealing members according to the invention shown in their undeformed as-molded form.

Another embodiment of a track belt seal in accord with the invention is shown in FIG. 6. The general cross-sectional configuration of the seal member is similar to that shown in FIG. 2. However, the radially outermost portions 42,43 for legs 40,41, respectively, of the seal are modified such that when they are urged together in a circumferential direction a shallow pocket 45 as shown by the dotted lines is formed between them. When in the footprint area, earth contacting the seal will enter this pocket forcing the radially outermost portions of the legs of the seal apart from one another thereby increasing the force with which the sealing surfaces interact with the traction shoes.

Figure 7:
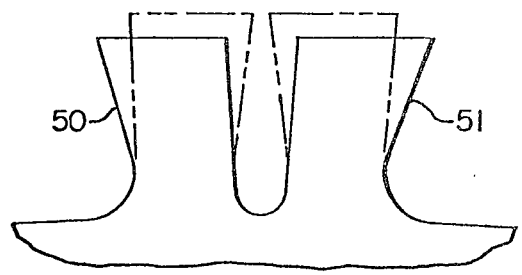
Figure 8:
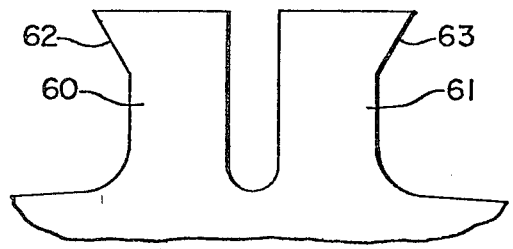

In FIG. 7, legs 50 and 51 are each in the form of an inverted taper. This embodiment will provide effective sealing but is more difficult to mold integral of the belt. In the embodiment shown in FIG. 8, legs 60 and 61, respectively, have circumferentially overhanging projections 62,63 at their radially outermost tips. These overhanging projections are designed to engage with the traction shoes 14 above their shoulders 38,39. When the shoulder of a traction shoe moves radially outward, the seal leg in engagement therewith is tensioned radially, and projection 62 or 63 is pulled into tighter engagement with its respective shoulder of the traction shoe.

Biasing means may be incorporated into the sealing members to further ensure contact of the sealing surfaces with the traction shoes. Upon mounting of the traction shoes, the biasing means are energized.

Figure 9:
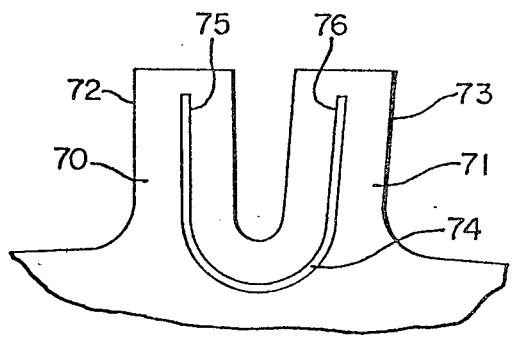
FIGS. 9, 10, 11, and 13 are enlarged cross-sectional views of four additional embodiments of sealing members according to the invention shown in their undeformed as-molded form, said members containing various means to further urge the sealing faces into engagement with the traction shoes.

In the embodiment shown in FIG. 9, legs 70 and 71 of the sealing member are urged circumferentially toward one another upon mounting of the traction shoes 14 thereby compressing the arms 75,76 of spring 74. Biasing member 74 aids in maintaining sealing engagement of surfaces 72 and 73 with the traction shoes. In place of spring 74 may be employed two separate biasing members so that legs 70 and 71 may operate fully independent of one another.

Figure 13:
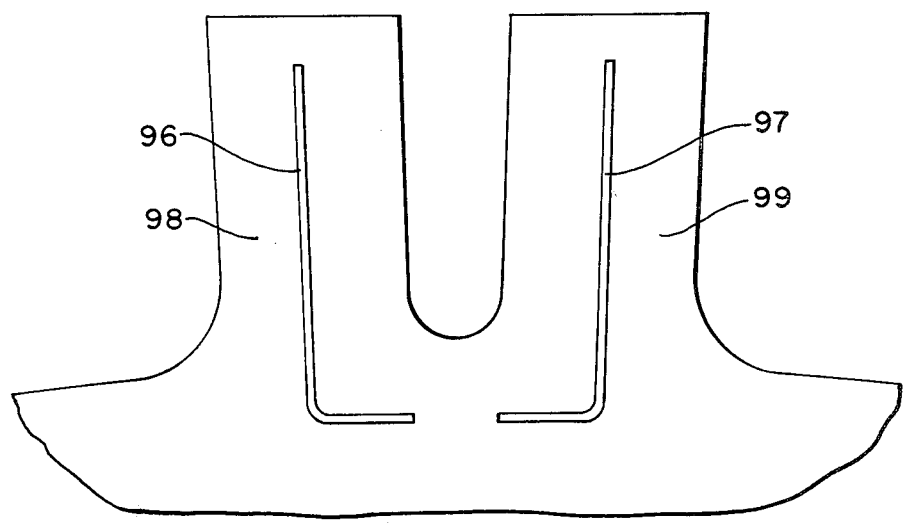

In the embodiment shown in FIG. 13, generally L-shaped spring members 96,97 in corresponding legs 98,99 of the sealing member are energized upon mounting of the traction shoes 14.

Figure 10:
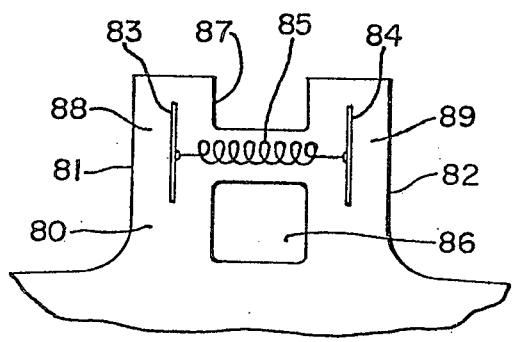

In the embodiment shown in FIG. 10, the sealing faces 81,82 of seal member 80 are urged into sealing contact by the action of spring 85 upon plates 83,84. It is understood that faces 81 and 82 are urged toward one another upon attachment of traction shoes 14, thereby energizing spring 85. Spring 85 and plates 83,84 are embedded within the elastomer. The amount of elastomer covering spring 85 need only be sufficient to protect it from the harsh operating conditions of the track-tire assembly. A groove 87 separates legs 88 and 89 radially outward of spring 85 and an aperture 86 separates legs 88,89 radially inward of spring 85.

Figure 11:
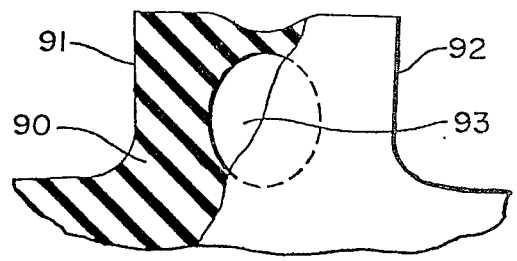

In the embodiment shown in FIG. 11, sealing member 90 has within it a chamber 93 which is sealed at the axial extremities of the seal member. This chamber may be pressurized. Upon mounting of traction shoes 14, sealing faces 91,92 are urged circumferentially toward one another thereby raising the pressure within chamber 93 above its as-molded state. During operation of a track tire assembly having seal member 90, the pressure in chamber 93 urges sealing faces 91,92 into engagement with the traction shoe surfaces. It is to be understood that the shape of chamber 93 may be any appropriate shape and is not to be limited to an annular cross-sectional configuration.

Figure 12:
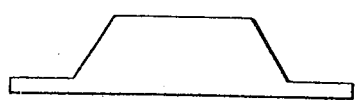
FIG. 12 is an enlarged cross-section of a strip of uncured elastomer.

A track belt having the integrally molded sealing members of this invention is formed by laminating layers of vulcanizable elastomer and circumferential reinforcement according to well-known methods. Embodiments other than those shown in FIGS. 9, 10, and 11 may be formed by extrusion of the elastomer of the radially outermost layer of the belt during its molding and vulcanization. Preferably, however, additional strips of elastomer that have been calendered or extruded to a cross-sectional shape similar to that shown in FIG. 12 are added to the radially outermost layer of the belt at circumferentially spaced-apart positions corresponding to the gaps between adjacent traction shoe sites. This minimizes distortion of the reinforcement layer of the belt and defective belts due to incomplete formation of the sealing members. For the embodiments shown in FIGS. 9, 10, and 11, the unvulcanized sealing members may be formed in a separate operation and placed on the unvulcanized belt in their proper locations prior to vulcanization into a unit. This procedure may also be employed for the other embodiments.

As previously mentioned, the compound chosen for the sealing strips should be formulated to yield values of resistance to abrasion, cutting, tearing, and permanent compression set. Compounds which are optimal for the radially outermost layer of the belt may have a different balance of characteristics than those required for the sealing member. To increase the service life of the sealing ribs, a fibrous reinforcement, such as nylon staple, may be mixed into the compound of which the sealing ribs are formed. Preferably, the nylon is treated with an RFL adhesive prior to its incorporation into the compound. Other fibers, for example, aramid, fiberglass, polyester, or rayon may be employed and preferably are treated with a suitable adhesive prior to dispersion into the compound.

While certain representative embodiments and details have been shown for the purpose of illustrating the invention, it will be apparent to those skilled in the art that various changes and modifications may be made therein without departing from the spirit or scope of the invention.

I claim:

1. A removable annular belt for use in a track tire assembly which assembly includes a plurality of track members on the radially outer surface of said belt at circumferentially spaced-apart positions, said belt having on its radially outer surface a plurality of circumferentially spaced-apart sealing members,
    each of said sealing members being of resilient material and extending tranversely of the circumferential direction of said belt,
    each of said sealing members being integrally formed with the radially outer surface of said belt,
    each of said sealing members including circumferentially extreme first and second legs projecting radially outwardly from the radially outer surface of said belt,
    said first leg being joined to the radially outer surface of said belt by a first curved edge portion,
    said second leg being joined to the radially outer surface of said belt by a second curved edge portion,
    said first leg having connected to said first curved edge portion a first radial planar sealing face,
    said second leg having connected to said second curved edge portion a second radial planar sealing face,
    said first and second legs of each sealing member in their undeformed state being spaced-apart from one another in the circumferential direction of the belt defining a gap between them extending from their radially outermost ends radially inwardly an amount substantially equal to the radial dimension of said legs,
    whereby the radial planar sealing face of each leg of each sealing member is adapted for sealing engagement with a corresponding one of said plurality of track members.

2. A removable track for an annular resilient tire comprising:
(a) an annular belt having a radially outer surface, and
(b) a plurality of track members mounted on said radially outer surface at circumferentially spaced-apart positions, each of said track members including a generally planar leading edge surface connected by a first curved surface to a belt engaging surface, and at its circumferentially opposite end, a generally planar trailing edge surface connected by a second curved surface to said belt engaging surface, said belt including
a plurality of sealing members integrally formed with the radially outer surface of said belt, one of said sealing members being disposed between each adjacent two of said track members,
each of said sealing members being of resilient material and extending transversely of the circumferential direction of said belt and having circumferentially opposite first and second curved edge portions at its juncture with said radially outer belt surface for engagement with the corresponding first and second curved surfaces of the corresponding adjacent track members,
each of said sealing members having adjacent its circumferential ends first and second legs projecting radially outwardly from said radially outer surface of said belt,
said first leg having a first generally radial planar sealing face on one circumferential side for engagement with the leading edge surface of the corresponding one of said track members, said sealing face being joined to the radially outer surface of said belt by said first curved edge portion,
said second leg having a second generally radial planar sealing face on the circumferentially opposite side for engagement with the trailing edge surface of the corresponding one of said track members, said sealing face being joined to the radially outer surface of said belt by said second curved edge portion,
said first and second legs of each sealing member prior to installation of the respective track members on said belt being spaced-apart in the circumferential direction of said belt defining a gap between them extending from their radially outermost ends radially inwardly an amount substantially equal to the radial dimension of said first and second legs.

3. A track-tire assembly including an annular resilient tire, and
a removable track mounted on the radially outer circumferential surface of said tire,
said track including an annular belt having a radially outer surface, a plurality of track members mounted on said radially outer surface at circumferentially spaced-apart positions, each of said track members including a generally planar leading edge surface connected by a first curved surface to a belt engaging surface, and circumferentially opposite, a generally planar trailing edge surface connected by a second curved surface to said belt engaging surface, and
a plurality of sealing members, one of said sealing members being disposed between each adjacent two of said track members, each of said sealing members being of resilient material and extending transversely of the circumferential direction of said track, each of said sealing members being integrally formed with the radially outer surface of said belt, each of said sealing members having adjacent its circumferential ends first and second legs which rise radially outwardly from said radially outer surface of said belt, said first leg being connected to the radially outer surface of said belt by a first curved edge portion adapted for engagement with the first curved surface of the corresponding one of said track members, said first leg having connected to said first curved edge portion a first generally radial planar sealing face on one circumferential side for engagement with the leading edge surface of the corresponding one of said track members, said second leg being connected to the radially outer surface of said belt by a second curved edge portion adapted for engagement with the second curved surface of the corresponding one of said track members, said second leg having connected to said second curved edge portion a second generally radial planar sealing face on the circumferentially opposite side for engagement with the trailing edge surface of the corresponding one of said track members, said first and second legs of each sealing member prior to installation of the respective adjacent track members being spaced-apart in the circumferential direction of said belt defining a gap between them extending from the radially outermost ends of said first and second legs radially inwardly an amount substantially equal to the radial dimension of said first and second legs.

4. A belt according to claim 1, a track according to claim 2, or an assembly according to claim 3, wherein each of said sealing members in its undeformed state is of V-shaped cross-sectional configuration with the point of the V directed toward the radially outer surface of said belt.

5. A belt according to claim 1, a track according to claim 2, or an assembly according to claim 3, wherein said belt has a radially outermost layer of elastomer and each of said sealing members is formed of an elastomer compound different from that of which the remainder of said radially outermost layer of said belt is formed.

6. A belt according to claim 1, a track according to claim 2, or an assembly according to claim 3, wherein each of said sealing members is formed of an elastomer compound having staple fibers dispersed throughout.

7. A belt according to claim 1, a track according to claim 2, or an assembly according to claim 3, wherein for each of said sealing members in its undeformed state said first planar sealing face of said first leg and said second planar sealing face of said second leg are substantially parallel and the circumferentially opposite faces of said legs face one another and define between them an acute angle which opens radially outwardly of said radially outer surface of said belt.

8. A belt according to claim 1, a track according to claim 2, or an assembly according to claim 3, wherein one of said sealing members has embedded therein biasing means.

9. A belt according to claim 1, a track according to claim 2, or an assembly according to claim 3, wherein one of said sealing members has embedded therein biasing means comprising a spring of substantially L-shaped configuration.

10. A belt according to claim 1, a track according to claim 2, or an assembly according to claim 3, wherein one of said sealing members has embedded therein biasing means comprising a spring of substantially U-shaped configuration.

11. A track according to claim 2 or an assembly according to claim 3, wherein each of said track members includes a shoulder at the radially outermost extent of each of its generally planar leading and trailing edge surfaces, and the radially outermost end of each first and second leg of said sealing members is at a radius greater than that of said shoulders.

12. A track according to claim 2 or an assembly according to claim 3, wherein each of said track members includes a shoulder at the radially outermost extent of each of its generally planar leading and trailing edge surfaces, and said first leg of each of said sealing members has near its radially outermost end a projection extending in the circumferential direction of said belt for engagement with said shoulder at the leading edge surface of the corresponding track member, and said second leg of each of said sealing members has at its radially outermost end a projection extending in the opposite circumferential direction of said belt for engagement with said shoulder of the trailing edge surface of the corresponding track member.

13. A removable track for an annular resilient tire comprising:
 (a) an annular belt having a radially outer surface, and
 (b) a plurality of track members mounted on said radially outer surface at circumferentially spaced-apart positions, each of said track members including a generally radial planar leading edge surface connected by a first curved surface to a belt engaging surface, and at its circumferentially opposite end, a generally radial planar trailing edge surface connected by a second curved surface to said belt engaging surface, said belt including
 a plurality of sealing members integrally formed with the radially outer surface of said belt, one of said sealing members being disposed between each adjacent two of said track members, each of said sealing members being of resilient material and extending transversely of the circumferential direction of said track, each of said sealing members in its undeformed state being of V-shaped cross-sectional configuration with the point of the V nearest said radially outer surface of said belt, each of said sealing members having at its circumferentially opposite ends first and second curved edge portions at its juncture with the radially outer belt surface for engagement with the corresponding first and second curved surfaces of the corresponding track members, each of said sealing members consisting of first and second legs projecting radially outwardly from said radially outer surface of said belt, said first leg having connected to said first curved edge portion a first generally radial planar sealing face on one circumferential side for engagement with the leading edge surface of the corresponding one of said track members, said second leg having connected to said second curved edge portion a second generally radial planar sealing face on the circumferentially opposite side for engagement with the trailing edge surface of the corresponding one of said track members, said first and second legs of each sealing member prior to installation of the respective adjacent track members being spaced-apart in the circumferential direction of said belt defining a gap between them extending from their radially outermost ends radially inwardly an amount substantially equal to the radial dimension of the legs.

* * * * *